US007356260B2

(12) United States Patent
Seifert

(10) Patent No.: US 7,356,260 B2
(45) Date of Patent: Apr. 8, 2008

(54) RESIDENTIAL SIGNAL BEACON

(76) Inventor: Billie Jo Seifert, 3148 Welcome Ave. North, Crystal, MN (US) 55422

( * ) Notice: Subject to any disclaimer, the term of this patent is extended or adjusted under 35 U.S.C. 154(b) by 538 days.

(21) Appl. No.: 10/876,238

(22) Filed: Jun. 24, 2004

(65) Prior Publication Data

US 2005/0012635 A1 Jan. 20, 2005

Related U.S. Application Data

(60) Provisional application No. 60/480,976, filed on Jun. 24, 2003.

(51) Int. Cl.
*H04B 10/10* (2006.01)

(52) U.S. Cl. ................ 398/106; 340/426.13; 455/352; 398/172

(58) Field of Classification Search ................ 398/106, 398/111, 208–209, 212–213, 172; 340/426.13–426.32; 375/310; 455/352
See application file for complete search history.

(56) References Cited

U.S. PATENT DOCUMENTS

| | | | | |
|---|---|---|---|---|
| 3,599,201 | A | 8/1971 | Clardy et al. | |
| 4,003,040 | A | 1/1977 | Browand | |
| D248,505 | S | 7/1978 | Koziol | |
| 4,547,761 | A | 10/1985 | Jones | |
| 4,686,505 | A | 8/1987 | Vanderburg | |
| 5,422,638 | A * | 6/1995 | Singer et al. | 340/908.1 |
| 5,986,576 | A * | 11/1999 | Armstrong | 340/908 |
| 6,017,131 | A | 1/2000 | Goins | |
| 6,104,313 | A * | 8/2000 | Boyd, II | 340/908.1 |
| 2003/0141984 | A1* | 7/2003 | Sarek et al. | 340/815.4 |

* cited by examiner

*Primary Examiner*—Leslie Pascal
(74) *Attorney, Agent, or Firm*—Patterson, Thuente, Skaar & Christensen, P.A.

(57) ABSTRACT

A residential signal beacon includes a prominent illuminated or reflective display for a resident's address along with a selectively activatable beacon for drawing attention to the resident's address. Beacon is operable by a remote control apparatus, so as to be selectively activatable and de-activatable. The residential signal beacon is preferably readily movable and secured by a weighted base or stakes driven into the ground.

12 Claims, 3 Drawing Sheets

RESIDENTIAL SIGNAL BEACON

CLAIM TO PRIORITY

This application claims priority to U.S. Provisional Application Ser. No. 60/480,976 filed Jun. 24, 2003 and entitled Improved Exterior Sign And Yard Light the entire contents of which are incorporated by this reference.

TECHNICAL FIELD

The present invention relates to a sign for identifying the address of a residence, for identifying the location of that residence, and more specifically to a lighting apparatus and method to aid in the location of such residence at night or during an emergency.

BACKGROUND OF THE INVENTION

It is sometimes difficult to identify the house number of a residence, and this problem is even more difficult at night when the house numbers are hidden or obscured by darkness. This problem can make locating a specific address very difficult for guests, package delivery, and especially emergency services. Examples of emergency services that need to find a specific house number quickly would be medical, police or fire services. Minor delays in responding to an emergency situation can have severe negative consequences for the structure of the house, surrounding property, or occupants of the house. It is also important that arriving guests, delivery personnel and emergency personnel be able to locate a specific residence quickly and accurately.

Location of a specific address at night is sometimes accomplished by pointing a spotlight at a house in search of the house numbers. This method is time consuming, delaying the arrival of emergency services to the correct address, and also intrusive to the occupants of any nearby residence that does not require identification. Homes in rural or remote locations set back from the road or hidden by trees, vegetation or fences, for example, may not have numbers in a location visible from the street, making searching for a specific residence very difficult.

Additionally, house numbers are typically preset in only one location, facing only one direction, such that a viewer must be in only a certain location to read the house numbers.

SUMMARY OF THE INVENTION

The present invention provides an efficient and effective solution to the problems of locating the house numbers of a residence by providing a structure having long metal posts that can be driven into the ground to secure the signaling light and house numbers in a location remote from and unattached to the structure of the house. This location would preferably be one to make the sign structure more easily visible from the street when someone in search of the house number drives by the residence. The sign include largest numbers in any of several arrangements, either horizontal, diagonal or vertical, such numbers being of a size such they be easily seen from the street. The numbers on the sign may be replicated on more than one surface, pointing in more than one direction to provide identification opportunities from several locations. The numbers further could be coated with a reflective material, or the surface of the numbers could be prepared to provide improved reflective qualities to aid in identifying the numbers at night.

The structure would further contain at least one light beacon, of any chosen color including white, capable of being switched on or off, such light to aid in the identification of a specific residence. For example, if the police are told the residence requesting help has a blue light in the front yard, prompt identification of the correct residence location is enhanced. The light may either remain continuously illuminated, of flash on and off at a rate that draws attention to the light. Several lights of different colors may be provided for use in different situations, or to further provide unique identification. For example, a white light may be additionally provided to illuminate the area surrounding the light, as well as to aid identification of the location.

The lights of the sign may be powered by a primary or secondary (rechargeable) battery, or be connected to an exterior power source directly or indirectly provided by the electric utility providing electric power to the residence. The secondary batteries in this case may be recharged by solar cells or some other available recharging power source.

Additional illumination may be provided to aid in the reflective illumination and identification of the house numbers at night.

If the lights of the sign are battery powered, it is advantageous to control when the lights turn on and off to preserve battery power and extend the useful life of a battery in the sign before the battery needs replacing or recharging. To simplify installation, it is advantageous if there were no wires connected between the residence and the remotely located sign. In such case, a wireless remote control may be used to turn the lights on or off, while a photocell may indicate that sufficient light exists to see the numbers and the light output of a specific light may be reduced or eliminated. Additionally, clocks and timers may be provided to control the time of day or the duration of illumination of the lights to preserve battery or light bulb life.

The wireless remote control may utilize a light signal, radio signal or audio signal to communicate commands to control the operation of the light or lights of the sign. The sign contains an apparatus to receive the signal, decode the command and then control the light function as commanded. The method of use of the remote control and the method of automatically controlling the illumination of the lights of the sign are thus provided.

DETAILED DESCRIPTION OF THE INVENTION

Figure 1:
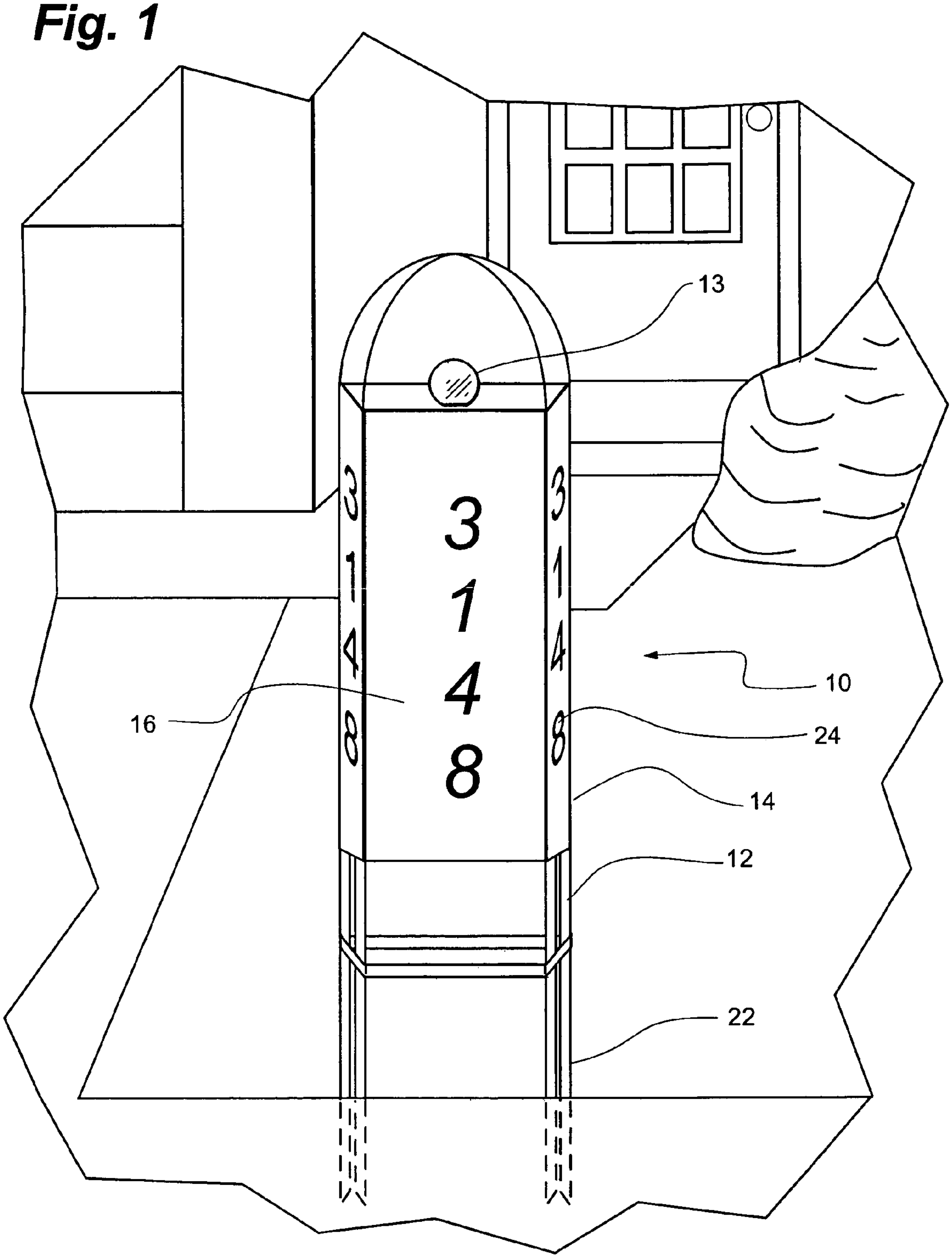
FIG. 1 is a perspective view of the sign in a preferred embodiment.
Figure 2:
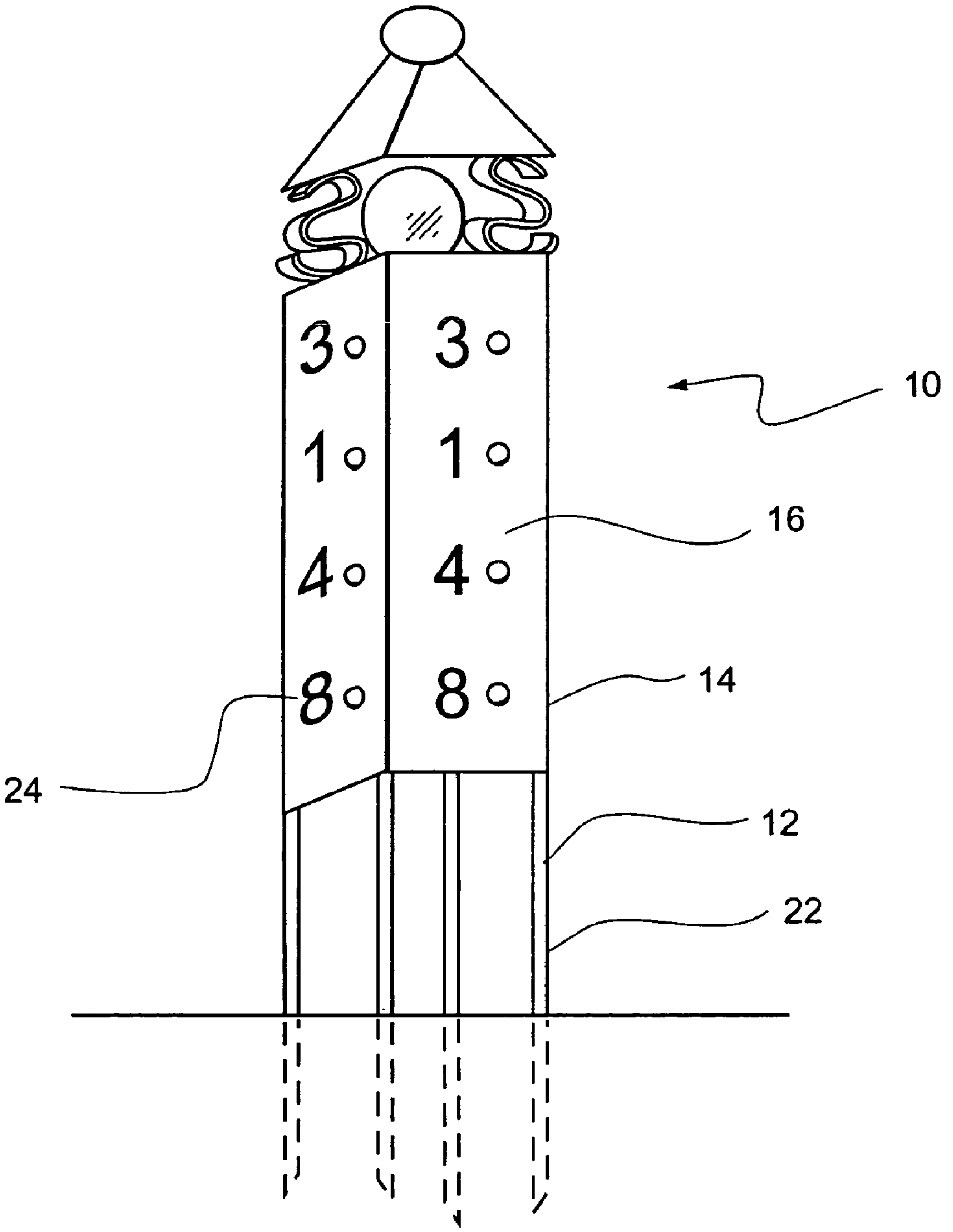
FIG. 2 is a perspective view of the sign in an alternate embodiment.

As illustrated in FIGS. 1 and 2, a structure is provided that has long poles to secure the sign into the ground in a manner that does not require digging because the sign is simply pushed or pounded into the ground at a convenient and visible location. Indicia displaying house numbers on the sign are arranged vertically on three sides, to aid identification of the numbers from the front or either side of the sign.

The top of the structure contains a battery-powered light or signal beacon under a clear dome. This light is controlled by a radio frequency or other remote control, and can be of any color, including white. The remote control is of a handheld size with a sufficient operating range to control the lights on the structure from inside a residence.

The signs in FIG. 1 and FIG. 2 have numbers greater than 3 inches in height, illuminated or coated with a reflective material. Additional small lights are placed next to the numbers to provide a reflected illumination of the numbers, which will aid in reading the numbers at night. The structure contains a radio receiver and electronic control mechanism to receive the commands given by the wireless remote control and then control the operation of the lights. The lights in FIG. 1 and FIG. 2 are powered by a replaceable primary cell battery of sufficient capacity to provide suitable operating life before battery replacement is required.

Signal beacon 10 of the present invention generally includes support 12, power supply 14, indicia display surface 16, controller transmitter 18 and receiver 20.

Support 12 may included stakes 22, or a weighted base (not shown). It is desirable that support 12 be easily placeable and removable so that signal beacon can be readily placed in a location visible to passers-by on a street or thoroughfare.

Indicia display surface 16 displays indicia such as a residential address 24. The indicia display surface 16 is multi-directionally visible and displays indicia prominently. Desirably, the indicia are illuminated or reflectorized to enhance visibility after dark Power supply 14 is preferably self-contained, such as a solar rechargeable battery. Power supply 14 may also be a conventional battery recharged by other means, or a power supply drawn from a local electric utility.

Figure 3:
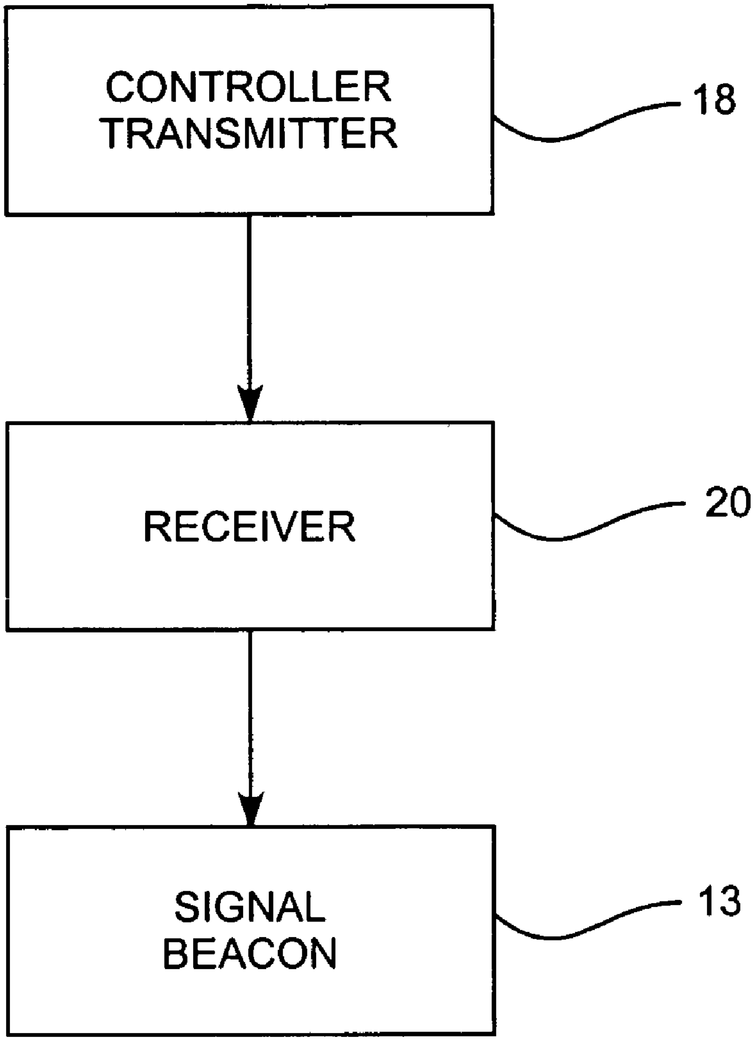
FIG. 3 is a block diagram of a control system in accordance with the present invention.

Referring to FIG. 3, controller transmitter 18 is desirably a wireless controller transmitter, although it may also be hardwired if desired. Receiver 20 is located at the signal beacon. Controller transmitter 18 is desirably hand-held and has a range sufficient to activate and deactivate signal beacon 10 from the location of the residence.

When activated, visible beacon 13 provides a prominent signal visible to passers-by or emergency crews or people trying to locate the residence. Visible beacon 13 may include a flashing light, strobe light, rotating beacon, or a preselected colored signal light.

The present invention may be embodied in other specific form without departing from the spirit of the essential attributes thereof, therefore, the illustrated embodiment should be considered in all respect as illustrative and not restrictive, reference being made to the appended claims rather than to the foregoing description to indicate the scope of the invention.

What is claimed is:

1. A system for visual signaling and address identification, comprising:

a power supply;

a visible signal beacon operably connected to said power supply, the visible signal beacon being capable of emitting a visible signal highly visible to passersby;

a prominently visible multidirectional surface displaying indicia, the indicia each indicating a residential address, the indicia being visible to passersby from at least two directions;

a wireless controller/transmitter located within a residence that is located at the residential address operable by an operator, the wireless controller being capable of providing at least two commands;

a wireless receiver in operable communication with said wireless controller/transmitter and operably connected to the visible signal beacon so as to allow selective activation and deactivation of the visible signal beacon;

a supporting structure supporting the visible signal beacon, the multidirectional visible surface displaying indicia and the wireless receiver; and in which the beacon is color coded in a predetermined color scheme to identify a residential location.

2. The system as claimed in claim 1, in which the wireless controller is in communication with the wireless receiver via infrared signals.

3. The system as claimed in claim 1, in which the wireless controller is in communication with the wireless receiver via radio frequency signals.

4. The system as claimed in claim 1, in which the wireless controller includes two momentary contact switches.

5. The system as claimed in claim 1, in which the signal beacon comprises a flashing light.

6. The system as claimed in claim 1, in which the signal beacon comprises a rotating light beacon.

7. A method of visual signaling and address identification, the method comprising the steps of:

operably connecting a power supply to a visible signal beacon, the visible signal beacon being capable of emitting a visible signal highly visible to passersby;

operably connecting a prominently visible multidirectional surface displaying indicia indicating a residential address to the visible signal beacon, the indicia being visible to passersby from at least two directions;

operably connecting a wireless receiver to the signal beacon whereby the signal beacon maybe selectively activated and deactivated;

generating a command from a wireless controller located within a residence that is at the residential address;

transmitting the command to the wireless receiver whereby the wireless receiver commands the signal beacon to activate or deactivate; and supporting the visible signal beacon, the multidirectional visible surface displaying indicia and the wireless receiver on a supporting structure in a location visible to passersby; and in which the beacon is color coded in a predetermined color scheme to identify a residential location.

8. The method as claimed in claim 7, in which the wireless controller is in communication with the wireless receiver via infrared signals.

9. The method as claimed in claim 7, in which the wireless controller is in communication with the wireless receiver via radio frequency signals.

10. The system as claimed in claim 7, in which the signal beacon comprises a flashing light.

11. The method as claimed in claim 7, in which the signal beacon comprises a rotating light beacon.

12. A device for visual signaling and address identification, comprising:

a power supply;

a visible signal beacon color coded in a predetermined color scheme to identify a residential location operably connected to said power supply, the visible signal beacon being capable of emitting a visible signal highly visible to passersby;

a prominently visible multidirectional surface displaying indicia indicating a residential address, the indicia being visible to passersby from at least two directions and displaying the residential address in the at least two directions;

a wireless controller/transmitter located within the residence operable by an operator, the wireless controller being capable of providing at least two commands;

a wireless receiver in operable communication with said wireless controller/transmitter and operably connected to the visible signal beacon so as to allow selective activation and deactivation of the visible signal beacon; and a supporting structure supporting the visible signal beacon, the multidirectional visible surface displaying indicia and the wireless receiver, the supporting structure comprising a supporting tower and elongate members adapted to be engaged into the ground to fix the device in a desired location.

* * * * *